US009736869B2

(12) United States Patent
Lin

(10) Patent No.: US 9,736,869 B2
(45) Date of Patent: Aug. 15, 2017

(54) ELECTRONIC DEVICE ASSEMBLY

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 110 days.

(21) Appl. No.: 14/556,422

(22) Filed: Dec. 1, 2014

(65) Prior Publication Data

US 2015/0372786 A1    Dec. 24, 2015

(30) Foreign Application Priority Data

Jun. 23, 2014  (CN) .......................... 2014 1 0281473

(51) Int. Cl.
| | |
|---|---|
| *H04W 76/02* | (2009.01) |
| *H04W 8/26* | (2009.01) |
| *H04W 4/00* | (2009.01) |
| *H04W 84/20* | (2009.01) |

(52) U.S. Cl.
CPC .............. *H04W 76/02* (2013.01); *H04W 4/00* (2013.01); *H04W 8/26* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 6,763,231 | B2 * | 7/2004 | Takatori ................ | H04M 1/725 370/336 |
| 2003/0235175 | A1 * | 12/2003 | Naghian ................. | H04L 12/66 370/338 |
| 2004/0048572 | A1 | 3/2004 | Godfrey | |
| 2004/0114625 | A1 * | 6/2004 | Roundy ................. | H04N 7/152 370/466 |
| 2006/0233120 | A1 * | 10/2006 | Eshel ................... | H04L 12/1822 370/260 |
| 2008/0310332 | A1 | 12/2008 | Hansen et al. | |
| 2012/0260013 | A1 * | 10/2012 | Lin ........................ | G06F 3/038 710/110 |
| 2013/0260798 | A1 * | 10/2013 | Moshfeghi ............ | H04W 4/025 455/456.5 |

FOREIGN PATENT DOCUMENTS

| | | |
|---|---|---|
| TW | M473578 | 3/2014 |
| TW | 201440469 | 10/2014 |
| WO | 2006099588 | 9/2006 |
| WO | 2006099588 A2 | 9/2006 |

\* cited by examiner

*Primary Examiner* — Omar Ghowrwal
*Assistant Examiner* — Angel Brockman
(74) *Attorney, Agent, or Firm* — Steven Reiss

(57) ABSTRACT

An electronic device assembly includes a master device and a plurality of slave devices. The master device includes a radio frequency (RF) connecting module, and the RF connecting module includes a plurality of master RF modules, and each master RF module includes one type of master interface. Each slave device includes a slave RF module, and the slave RF module includes different types of slave interfaces. The types of the master interfaces of the master device are not less than the types of the slave interfaces of the plurality of slave devices. Each master interface is connected to a corresponding slave interface via a wireless connection, and each master interface has the same wireless format and the same signal format as the corresponding slave interface.

12 Claims, 5 Drawing Sheets

ELECTRONIC DEVICE ASSEMBLY

CROSS-REFERENCE TO RELATED APPLICATIONS

This application claims priority to Chinese Patent Application No. 201410281473.3 filed on Jun. 23, 2013, the contents of which are incorporated by reference herein.

FIELD

The subject matter herein generally relates to electronic device assemblies.

BACKGROUND

Electronic devices, such as electronic white boards, computer, and so on, are always coupled to a plurality of slave devices, such as mobile phones, universal serial buses (USBs), and so on. The plurality of slave devices is connected to the main electronic devices in parallel.

BRIEF DESCRIPTION OF THE DRAWINGS

Implementations of the present technology will now be described, by way of example only, with reference to the attached figures.

DETAILED DESCRIPTION

Figure 1:
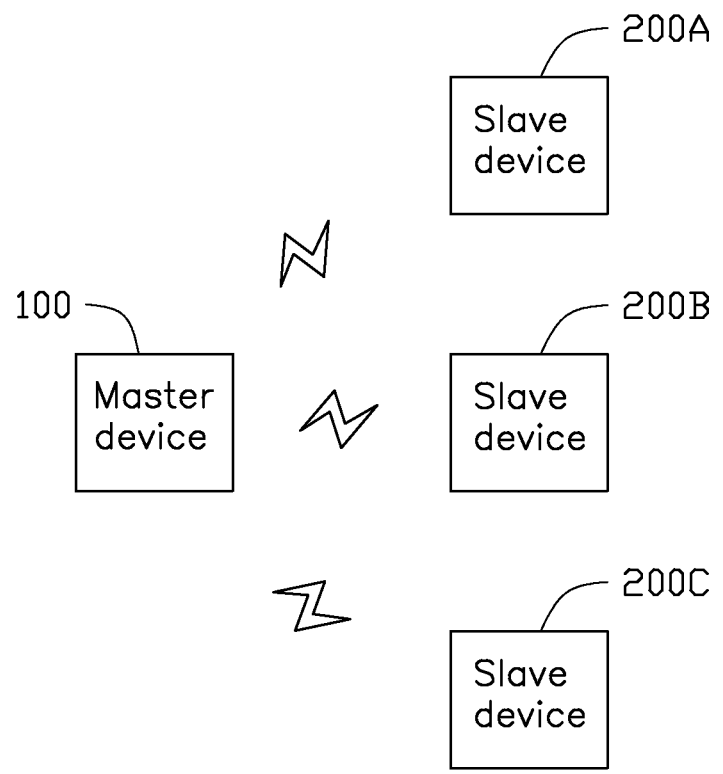
FIG. 1 is a block diagram of one embodiment of an electronic device assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
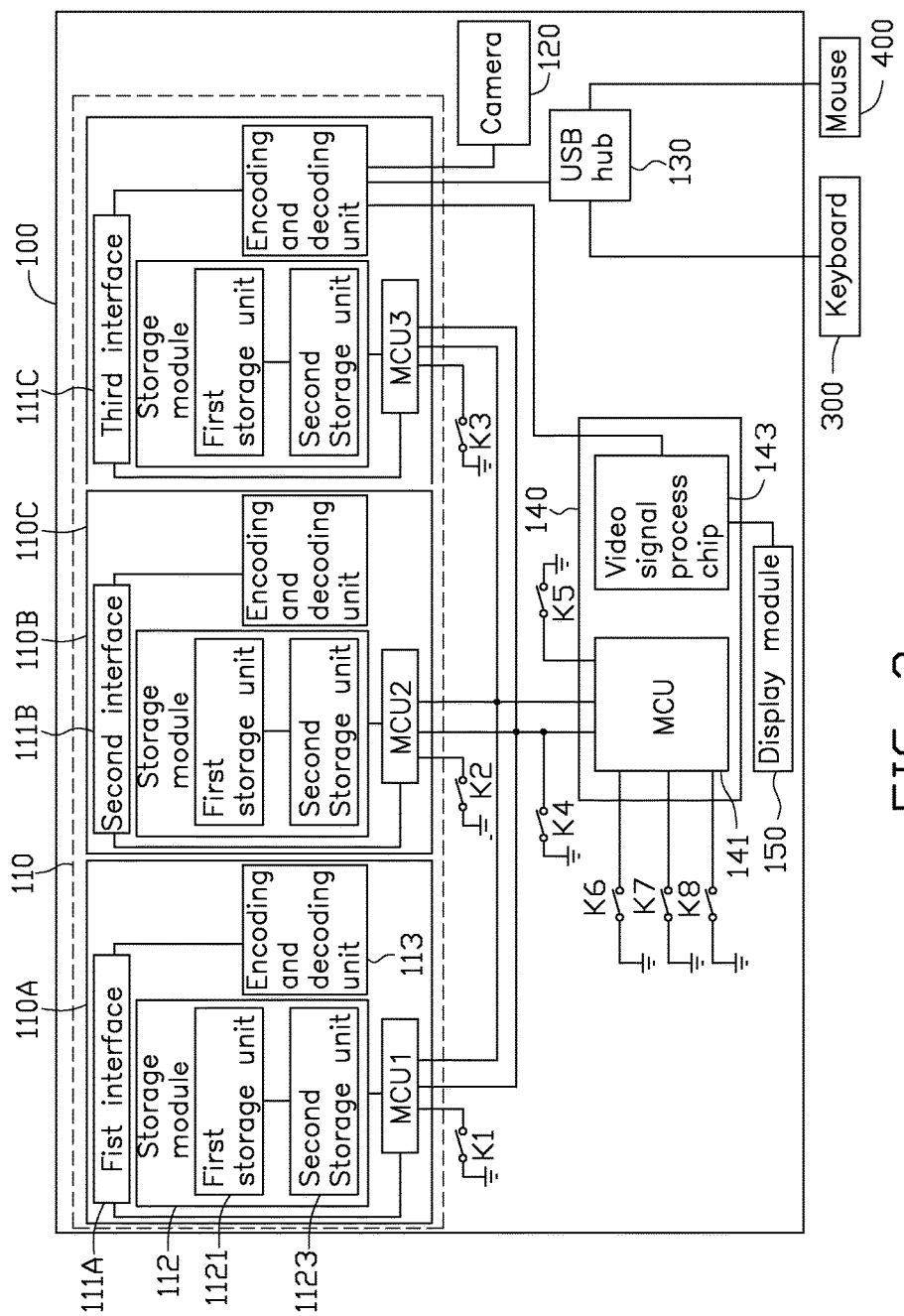
FIG. 2 is a block diagram of first embodiment of a master device.
Figure 3:
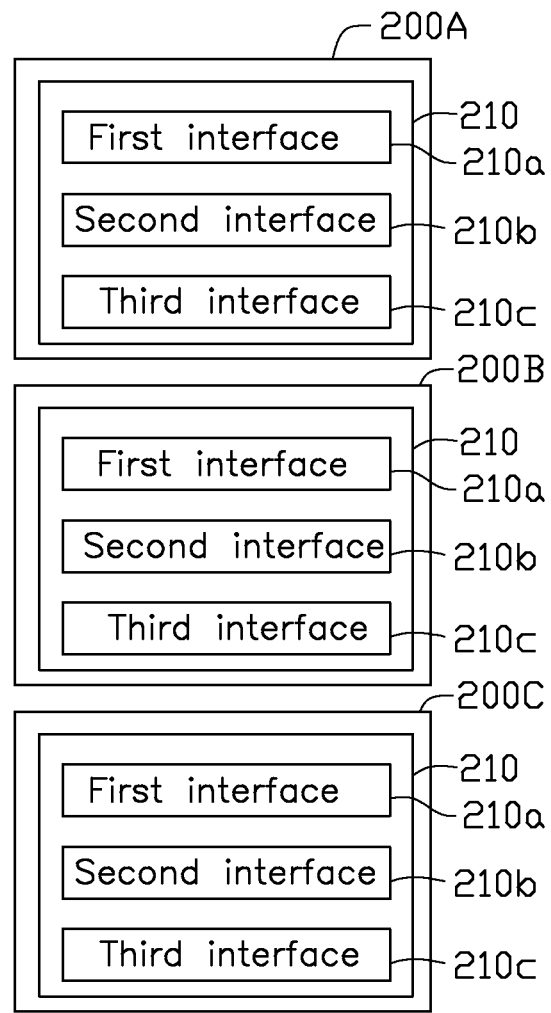
FIG. 3 is a block diagram of first embodiment of a slave device.

FIGS. 1-3 illustrate an electronic device assembly in accordance with an embodiment. The electronic device assembly can include a master device 100 and a plurality of slave devices 200A-200C. In at least one embodiment, the master device 100 can be a monitor, a television (TV) or a mobile phone, and the plurality of slave devices 200A-200C can be tablet computers, mobile phones, power supplies, hard disks, routers and so on.

Each slave device 200A, 200B, 200C can include a slave radio frequency (RF) module 210, and the slave RF module 210 can include a first interface 210a, a second interface 210b, and a third interface 210c. The type of the first interface 210a is different from the second interface 210b and the third interface 210c, and the second interface 210b is different from the third interface 210c. In at least one embodiment, the first interface 210a, the second interface 210b and the third interface 210c may be wireless fidelity (WIFI®) or BLUETOOTH® (BT) or wireless gigabit (Wi-Gig®).

The master device 100 can include a RF connecting module 110, a camera 120, a universal serial bus (USB) hub 130, a main board 140, and a display module 150. The RF connecting module 110 is coupled to the camera 120, the USB hub 130, and the main board 140. The display module 150 is coupled to the main board 140. The camera 120 can take a photo and send the photo to the slave devices 200A-200C through the master RF connecting module 110. The master device 100 and the slave devices 200 can display the photo. The USB hub 130 is coupled to a keyboard 300 and a mouse 400. The keyboard 300 and the mouse 400 can control the master device 100 and the slave devices 200A-200C.

The RF connecting module 110 can include a plurality of master RF modules 110A-110C. The master RF module 110A can include a first interface 111A, the master RF 110B can include a second interface 111B, and the master RF module 110C can include a third interface 111C. The first interface 111A of the master device 100 and the first interface 210a of the slave device 200A, 200B, 200C have same wireless format and same signal format. The second interface 111B of the master device 100 and the second interface 210b of the slave device 200A, 200B, 200C have same wireless format and same signal format. The third interface 111C of the master device 100 and the third interface 210c of the slave device 200A, 200B, 200C have same wireless format and same signal format.

Each master RF module 110A, 110B, 110C can include a secondary controller unit (MCU1-MCU3), a storage module 112, and an encoding and decoding unit 113. The encoding and decoding unit 113 can convert the signal outputted by the slave device 200A, 200B, 200C or the master device 100 so that the slave device 200A, 200B, 200C and the master device 100 can communicate with each other. The storage module 112 can include a first storage unit 1121 and a second storage unit 1123. The secondary MCU1 is coupled to a signal matching key K1, the secondary MCU2 is coupled to a signal matching key K2, and the secondary MCU3 is coupled to a signal matching key K3.

The first storage unit 1121 of the master RF module 110A can storage codes of the first interfaces 210a of the slave devices 200A-200B. In at least one embodiment, the codes of the first interfaces 210a of the slave devices 200A-200C are 200A-200C are 200A210a-MAC01, 200B210a-MAC02, 200C210a-MAC03.

The first storage unit 1121 of the master RF module 110B can storage codes of the second interfaces 210b of the slave devices 200A-200B. The codes of the second interfaces 210b of the slave devices 200A-200C are 200A 210b-MAC01, 200B 210b-MAC02, 200C 210b-MAC03.

The first storage unit 1121 of the master RF module 110C can storage codes of the third interfaces 210c of the slave devices 200A-200B. The codes of the third interfaces 210c of the slave devices 200A-200C are 200A 210C-MAC01, 200B 210C-MAC02, 200C 210C-MAC03.

The second storage units 1123 of the master RF modules 110A-110C can storage addresses of the slave devices 200A-200C. In at least one embodiment, the address of the slave device 200A is 01, the address of the slave device 200B is 02, and the address of the slave device 200C is 03. The secondary MCU1-MCU3 can assign addresses for the slave devices 200A-200C.

The mother board 140 can include a master micro control unit (MCU) and a video signal process chip 143. The master MCU 141 is coupled to a matching key K5, and a multi-matching key K4 is coupled to the secondary MCU1-MCU2 and the master MCU 141.

In work, when the multi-matching key K4 is pressed for a first time, the master MCU 141 can output an address 01. The outputted address is saved in the second storage 1123. Thus, the master device 100 waits for the call by the slave device 200A or calls the slave device 200A. After the slave device 200A calls the master device 100 and if the signal matching key K1 is pressed, the first interface 111A of the master RF module 110A is mated with the first interface 210a of the slave device 200A. If the signal matching key K2 is pressed, the second interface 111B of the master RF module 110B is mated with the second interface 210b of the slave device 200A. If the signal matching key K3 is pressed, the third interface 111C of the master RF module 110C is mated with the third interface 210c of the slave device 200A.

Using the same way, when the multi-matching key K4 is pressed for a second time, the master MCU 141 can output address 02 so that the slave device 200B can call the master device 100 or the master device 100 can call the slave device 200B. When the multi-matching key K4 is pressed for a third time, the master MCU 141 can output address 03 so that the slave device 200C can call the master device 100 or the master device 100 can call the slave device 200C.

Figure 4:
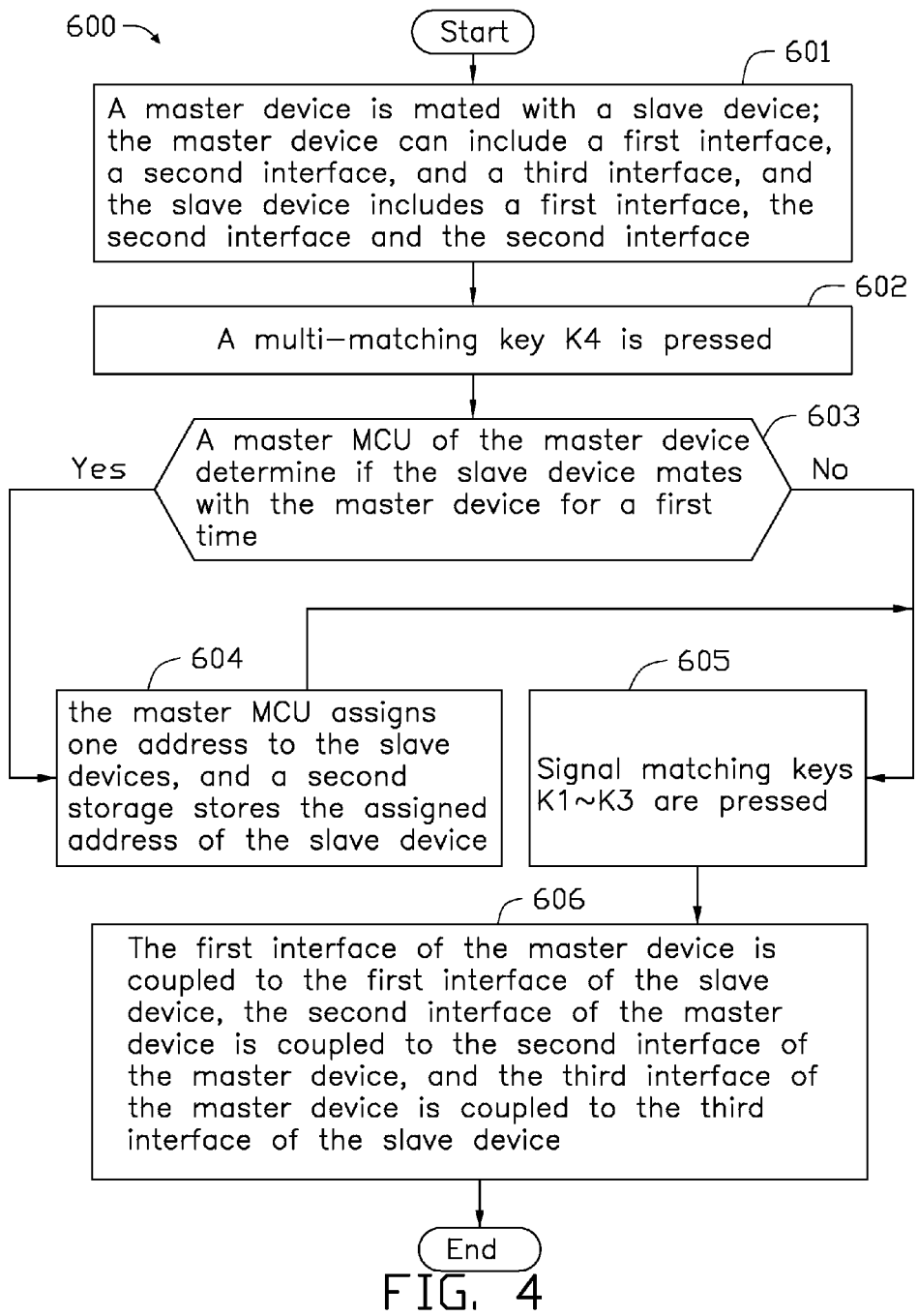
FIG. 4 is a flowchart showing one embodiment of a matching method.

Referring to FIG. 4, a flowchart is presented in accordance with an example embodiment of matching method 600. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 601.

At block 601, a master device is mated with a slave device. The master device can include a first interface, a second interface, and a third interface, and the slave device includes a first interface, the second interface and the second interface. In at least one embodiment, the first interfaces have same wireless format and are different from the second interfaces and the third interfaces, the second interfaces have same wireless format and are different from the third interfaces, and the third interface have same wireless format.

At block 602, a multi-matching key K4 is pressed.

At block 603, a master MCU of the master device determine if the slave device mates with the master device for a first time. When the slave device mates with the master device for a first time, the method goes to block 604. When the slave device does not mate with the master device for a first time, the method goes to block 605.

At block 604, the master MCU assigns one address to the slave devices, and a second storage stores an address of the slave device.

At block 605, signal matching key K1-K3 are pressed.

At block 606, the first interface of the master device is coupled to the first interface of the slave device, the second interface of the master device is coupled to the second interface of the master device, and the third interface of the master device is coupled to the third interface of the slave device.

Figure 5:
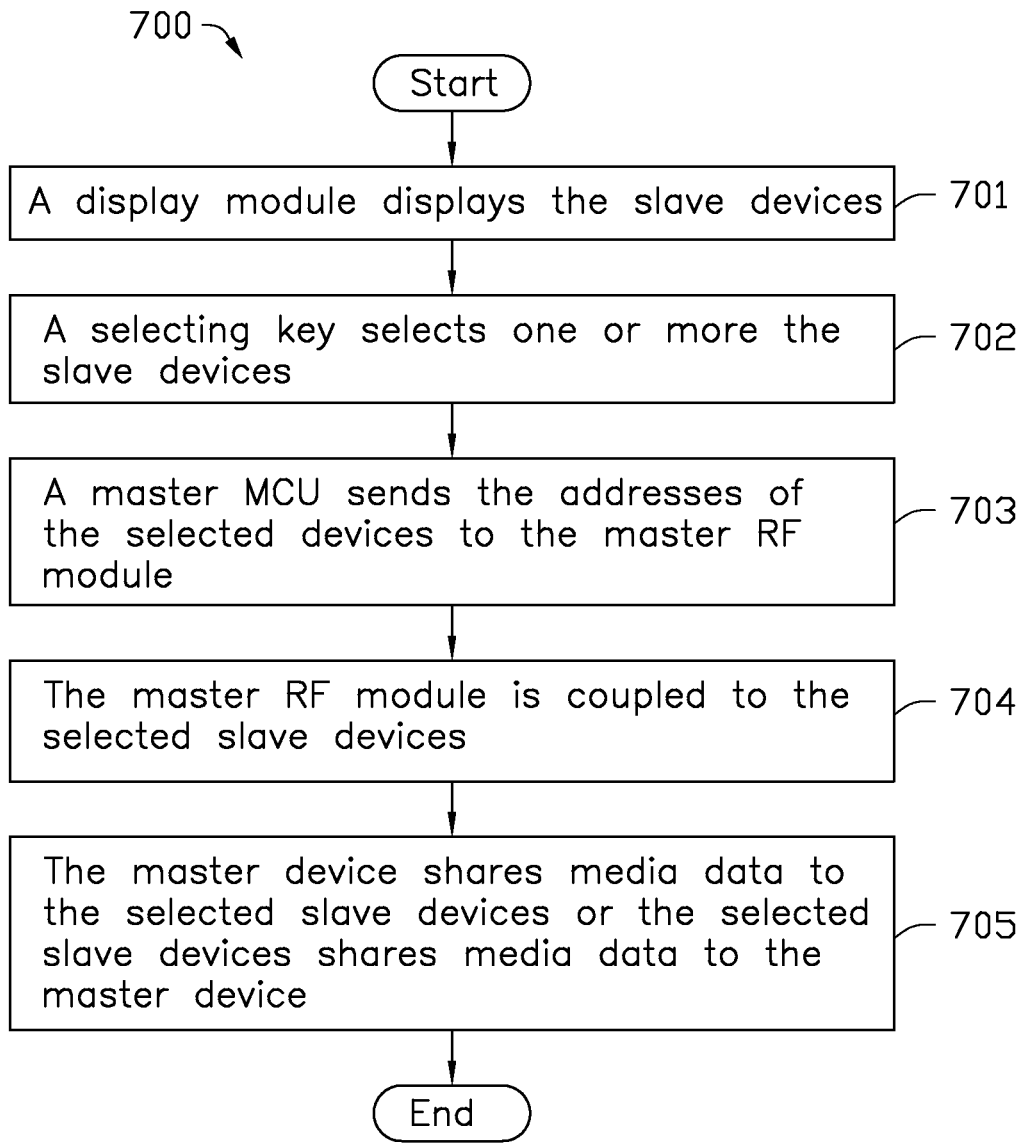
FIG. 5 is a flowchart showing one embodiment of a method of connecting the master device to one or more the slave devices.

Referring to FIG. 5, a flowchart is presented in accordance with an example embodiment of a method of connecting the master device with one or more slave devices 700. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 5 represents one or more processes, methods or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 701.

At block 701, a display module displays the slave devices.

At block 702, a selecting key selects one or more the slave devices.

At block 703, a master MCU sends the addresses of the selected devices to the master RF module.

At block 704, the master RF module is coupled to the selected slave devices.

At block 705, the master device shares media data to the selected slave devices or the selected slave devices shares media data to the master device. The media data may be photos, videos or pictures.

The embodiments shown and described above are only examples. Many details are often found in the art such as the other features of an electronic device assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An electronic device assembly comprising:
a master device comprising a radio frequency (RF) connecting module and a multi-matching key, the RF connecting module comprising a plurality of master RF modules, each master RF module comprising one type of master interface; and a plurality of slave devices, each slave device comprising a slave RF module, and the slave RF module comprising different types of slave interfaces;

wherein the number of types of master interfaces of the master device are greater than or equal to the number of types of slave interfaces of the plurality of slave devices;

each master interface is connected to a corresponding slave interface via a wireless connection;

each master interface has the same wireless format and the same signal format as the slave interface corresponding thereto;

the RF connecting module is configured to connect one or more slave devices after pressing the multi-matching key; and each master RF module further comprises a storage module, the storage module comprises a first storage unit and a second storage unit, the first storage unit is configured to storage codes of the slave interfaces of each slave device, and the second storage unit is configured to storage the assigned addresses of slave devices.

2. The electronic device assembly of claim 1, wherein the master device further comprise a master micro controller unit (MCU), the master MCU is coupled to the multi-matching key and the RF connecting module, and the master MCU is configured to assign addresses for the slave devices.

3. The electronic device assembly of claim 1, wherein each master RF module is coupled to a signal matching key, and the master interface is coupled to corresponding slave interface after pressing the signal matching key.

4. The electronic device assembly of claim 1, wherein each master RF module further comprises an encoding and decoding unit, and the encoding and decoding unit is configured to encode or decode the signal format.

5. The electronic device assembly of claim 1, wherein the master device further comprises a universal serial bus (USB) hub, a keyboard, and a mouse, the USB hub is coupled to the RF connecting module, the keyboard and the mouse are coupled to the USB hub, and the keyboard and the mouse are configured to output information to the master device and the slave devices.

6. The electronic device assembly of claim 1, wherein each slave device comprise a first interface, a second interface and a third interface, the first interface is configured to coupled to a first interface of the RF connecting module, the second interface is configured to be coupled to a second interface of the RF connecting module, and the third interface is configured to be coupled to a third interface of the RF connecting module.

7. The electronic device assembly of claim 6, wherein the types of the first interfaces are different from the types of the second interfaces and the third interfaces, and the types of the second interfaces are different from the types of the third interfaces.

8. An electronic device assembly comprising:
a master device comprising a radio frequency (RF) connecting module and a multi-matching key, the RF connecting module comprising a plurality of master RF modules, the plurality of master RF modules comprises a first master RF module, a second master RF module, and a third master RF module, the first master RF module comprising a first interface, the second master RF module comprising a second interface having type different from the first interface, and the third master RF module comprising a third interface having type different from the first interface and the second interface; and a plurality of slave devices, each slave device comprising a slave RF module, the slave RF module comprising a first interface, a second interface and a third interface;

wherein the first interfaces of the plurality of slave devices have the same wireless format and the same signal format as the first interface of the master device, the second interfaces of the plurality of slave devices have the same wireless format and the same signal format as the second interface of the master device, and the third interfaces of the plurality of slave devices have the same wireless format and the same signal format as the third interface of the master device;

the first interface of the first master RF module is configured to be coupled to the first interface of one of slave devices, the second interface of the second master RF module is configured to the second interface of one of slave device, and the third interface is configured to be coupled to the third interface of one of slave devices;

the RF connecting module is configured to connect one or more slave devices after pressing the multi-matching key; and each master RF module further comprises a storage module, the storage module comprises a first storage unit and a second storage unit, the first storage unit is configured to storage codes of the first interface, the second interface and the third interface of each slave device, and the second storage unit is configured to storage the assigned addresses of slave devices.

9. The electronic device assembly of claim 8, wherein the master device further comprise a master micro controller unit (MCU), the master MCU is coupled to the multi-matching key and the RF connecting module, and the master MCU is configured to assign addresses for the slave devices.

10. The electronic device assembly of claim 8, wherein each master RF module is coupled to a signal matching key, and the master device is configured to be coupled to corresponding slave device through the RF connecting module and the slave RF module after pressing the signal matching key.

11. The electronic device assembly of claim 8, wherein each master RF module further comprises an encoding and decoding unit, and the encoding and decoding unit is configured to encode or decode the signal format.

12. The electronic device assembly of claim 8, wherein the master device further comprises a universal serial bus (USB) hub, a keyboard, and a mouse, the USB hub is coupled to the RF connecting module, the keyboard and the mouse are coupled to the USB hub, and the keyboard and the mouse are configured to output information to the master device and the slave devices.

* * * * *